July 15, 1969

H. R. NEWELL 3,456,139

WOBBLE DRUM STEP MOTOR

Filed Dec. 11, 1967

INVENTOR
HAROLD R. NEWELL

BY *Hurvitz, Rose & Greene*

ATTORNEYS

July 15, 1969   H. R. NEWELL   3,456,139
WOBBLE DRUM STEP MOTOR
Filed Dec. 11, 1967   2 Sheets-Sheet 2

INVENTOR
HAROLD R NEWELL
BY Hurwitz, Rose & Greene
ATTORNEYS

# United States Patent Office 3,456,139
Patented July 15, 1969

3,456,139
WOBBLE DRUM STEP MOTOR
Harold R. Newell, South Newbury, N.H., assignor to Mesur-Matic Electronics Corp., Warner, N.H., a corporation of Delaware
Filed Dec. 11, 1967, Ser. No. 689,535
Int. Cl. H02k 37/00
U.S. Cl. 310—49    10 Claims

ABSTRACT OF THE DISCLOSURE

A digital step motor with two stators having a wobble drum rotatable about a shaft under the influence of a stepping electromagnetic drive, to produce meshing between two sets of cooperating gear teeth, the gear of one set of which is pinned to the shaft for rotation of the shaft therewith. The wobble drum is coupled to the shaft about which it rotates by a universal joint free to move axially, but substantially confined radially of the shaft. Radially disposed circumferentially placed permanent magnets may be provided in the drum on a fixed central extension of the motor housing to provide a magnetic detent effective when the stator coils are not energized.

Background of the invention

The present invention relates generally to electromagnetically actuated digital stepping motors, and more particularly to a digital step motor in which a drum having gear teeth thereon is caused to rotate in wobble motion about a shaft in such manner as to drive the shaft at a low stepped rate of speed.

In my co-pending application, Ser. No. 664,331 entitled, "Harmonic Drive for Digital Step Motor," filed Aug. 30, 1967, and commonly assigned herewith, I briefly described some of the prior art devices utilizing harmonic drive or strain wave gearing in which areas of mating relationship or engagement between the teeth of two cooperating mating gears are peripherally propagated in the form of a sinusoidal or substantially sinusoidal wave representative of a wave deflection or strain wave in one of the gears. The concept of harmonic drive is set forth in some detail in U.S. Patent 2,906,143, granted to Musser, issued Sept. 29, 1959, the first of a group of patents on devices using that concept and on improvements thereon.

In my aforementioned co-pending application I disclose an improvement upon prior art forms of systems utilizing the harmonic drive concept, in which a step motor is provided with a wobble plate subjected to a desired stepped rotation, subsequently transferred to the motor shaft, by the sequential switching of stator windings, and in which the coupling point between the wobble plate and the shaft takes the form of a universal joint or a ball joint arrangement on which the plate rotates and is free to move longitudinally along the axis of rotation but is restrained from movement in a radial direction relative to the shaft axis. According to an embodiment of that invention, a pair of cooperating circular ring gears of the same diameter are provided with teeth projecting from substantially confronting planes. At least one of the ring gears is rigid, fastened to the internal surface of the larger diameter wall of a concentric cylindrical double walled housing having a bridge joining the walls at a common end thereof to form a "doughnut cup"-shaped enclosure. This enclosure or housing contains a laminated annular magnetic core having a plurality of equi-angularly spaced coils, corresponding to the desired number of motor phases, wound thereon. A shaft extends within the inner wall of the housing along the axis thereof and is mounted for rotation in bearings retained at either end of the space encompassed by the inner wall.

An armature or rotor in the form of a magnetically permeable circular plate (i.e., the wobble plate) is coupled to the shaft in the aforementioned manner for relative rotation therewith, and has adjacent its periphery along a planar surface of the plate the second of the aforementioned ring gears, one ring gear (preferably that on the armature) having at least one tooth less than the other ring gear, the teeth of the two gears normally spaced from one another. In the preferred embodiment the armature is rigid, as is its ring gear. One end of the magnetic core in the housing confronts the armature and as the phases (field windings and cores thereof) of the motor are energized in the desired switching format, the armature is successively pulled toward each energized coil. Accordingly, the teeth of two ring gears are forced into mating engagement, i.e., intermeshed, at only one limited region of each gear at any given instant of time. As the coil switching progresses the armature wobbles about the shaft, the position at which its ring gear meshes with the stationary ring gear fastened to the housing propagating substantially sinusoidally along that gear in accordance with the wobble motion. This constitutes a sinusoidal wave motion, the armature constituting a mass rotating at an extremely low rotatory rate which depends upon tooth differential, number of motor phases, and switching format for the phases. A relative rotation occurs between the two ring gears, and if the armature has fewer teeth it rotates that number of fewer teeth for each revolution of the wobble (i.e., each revolution of the intermeshed position of the gears), and in a reverse direction to the direction of rotation of the wobble.

A second pair of ring gears is provided by which the armature is coupled to the shaft to drive the latter in accordance with armature rotation so that the shaft undergoes discrete (stepped) rotational motion in accordance with the switching format phase energization of the motor. This second pair of gears operates to transmit torque to the shaft in a positive and reliable manner, yet with a minimum of frictional drag or power loss.

By employing a wobble plate which is pivotally coupled to the shaft by a universal joint free to move longitudinally along the axis of the shaft but constrained against movement radially of the shaft, the force exerted by the driving magnetic field is divided between the two sets of gears such that both sets are held in full mesh at all times, with virtually none of the looseness or play found in prior art wobble motors, irrespective of the production tolerances or unevenness in the gears caused by wear over extensive periods of time.

It is a principal object of my present invention to provide a digital step motor having advantages similar to those of my wobble plate step motor mentioned above, but wherein is employed a novel wobble element to provide low speed rotation of the motor shaft as the wobble element is subjected to sinusoidal deflection on the tracks provided by cooperating gear sets.

Summary of the invention

According to the present invention, the stepping motor comprises a wobble element in the form of a rotatable drum arranged to pivot at a slight angle of inclination to the longitudinal axis of the motor shaft in response to energization of field windings in a preselected sequence on a pair of stators, one stator located at each end of the wobble drum. The drum carries a ring gear at either end thereof, the teeth of the ring gears projecting radially inwardly toward the shaft, and cooperating with mating teeth on respective smaller diameter gears, one of which is rigidly attached to the housing frame of the motor and the other of which is pined or keyed to the motor shaft for rotation thereof. In operation, successive energization of motor fields or phases produces a wobble of the rotor drum gears into mesh with the fixed drive gear at one end of the rotor and diagonally opposite into mesh with the rotary drive gear pinned to the shaft. A universal joint or ball joint is provided at the center of dynamic balance of the wobbling drum and is connected to the shaft thereat to provide the pivot point.

It is therefore a further object of the present invention to provide a stepping motor having a wobble drum with cooperating gear sets to impart desired slow rotary motion to the motor shaft.

In a modification of the present invention, the cooperating gears are cut at corresponding angles, and the universal joint on which the drum pivots is retained on the shaft with axial freedom therealong to permit the drum to slide axially within predetermined limits, but is restrained from radial movement, to insure meshing of the gears at the desired points while preventing any rotational looseness which might create inaccuracy in the operation. The seating pressure between the teeth as produced by the magnetic fields is divided between the two sets of teeth upon automatic adjustment of the axial position of the drum.

It is therefore a further object of the present invention to provide a digital step motor having a wobble drum which is free to move axially within predetermined limits along the motor shaft to insure complete meshing of the teeth in a limited sector as the wobble drum is successively forced against the regions of the cooperating gears upon sequential switching of the motor phases.

Another feature of the present invention resides in the provision of a wobbling drum, harmonic drive, digital step motor with magnetic detent to provide latching of the wobble drum without need for application of power, on a standby basis.

Brief description of the drawings

The above and still further objects, features and attendant advantages of the present invention will become apparent from consideration of the following detailed description of certain preferred embodiments thereof, especially when taken in conjunction with the accompanying drawings in which.

Description of the preferred embodiment

Figure 1:
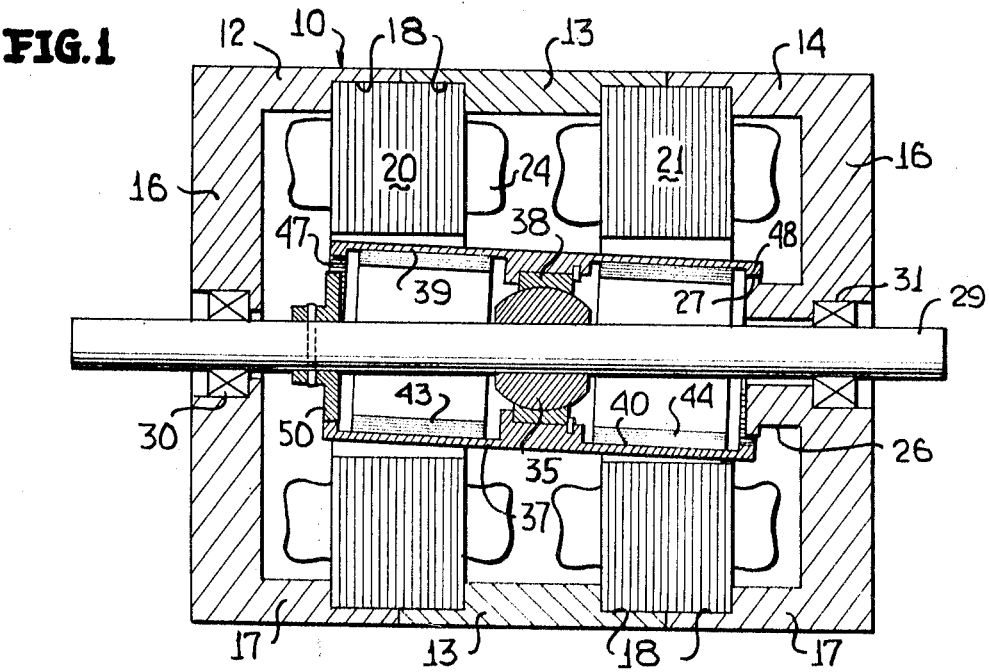
FIGURE 1 is a sectional view of the motor taken through a plane containing the axis of the motor shaft.
Figure 2:
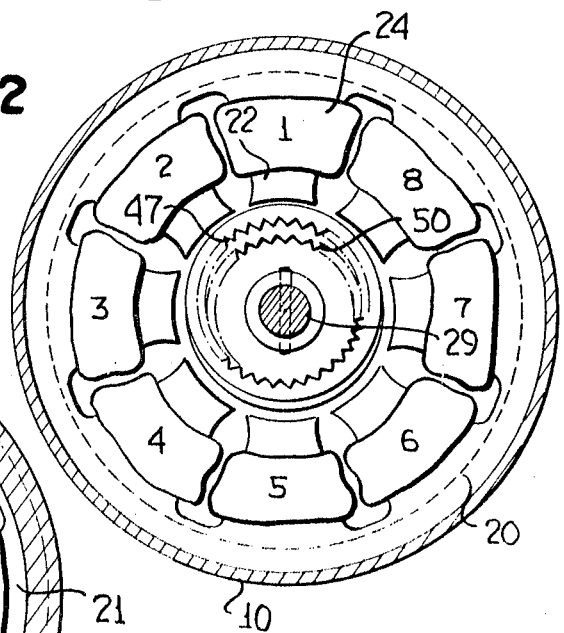
FIGURE 2 is an end view of the motor of FIGURE 1 with the housing end removed, taken from the left hand side of the motor as viewed in FIGURE 1.
Figure 3:
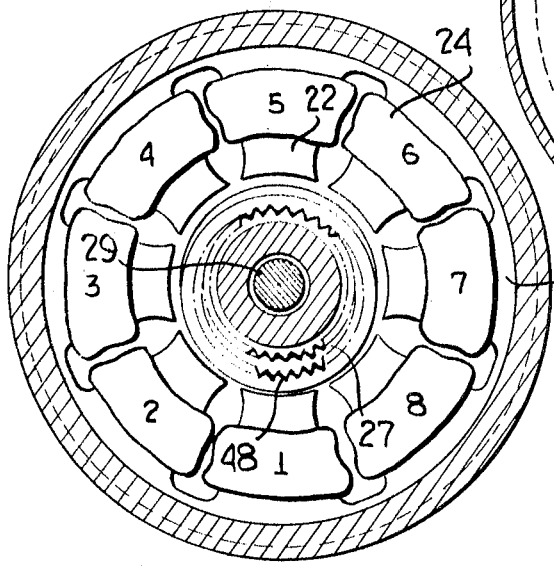
FIGURE 3 is an end view of the motor with a portion of the housing removed and with a fragmentary portion of the housing showing the fixed gear in place, taken from the right hand end of the motor as viewed in FIGURE 1.

Referring now to FIGURES 1–3, the motor housing 10 is of substantially cylindrical shape, and is preferably comprised of three separate portions 12, 13, 14 which are fastened together to permit ease of assembly of the motor and motor components. The end sections 12 and 14 of the housing each comprise an end wall or plate 16 having a cylindrical wall 17 extending from the periphery thereof, and the central portion or mid-section 13 of the housing comprises a tubular portion having inner and outer diameter corresponding to those of the end sections. Both the end sections 12, 14 and the mid-section 13 are undercut along a portion 18 of the inner periphery thereof to permit insertion of a pair of rings 20, 21 of stator cores 22, the stators hereinafter sometimes referred to as stator A and stator B, respectively. Each core 22 comprises a plurality of laminations of magnetically permeable material (as best observed in FIGURE 1) cut in cylindrical fashion and having radially inwardly projecting segments (as best seen in FIGURES 2 and 3) on which the coils 24 associated with each field winding are wound.

An internal annular region 26 of (or connected to) end member 14 of the motor housing is provided with a circular gear 27 having angularly cut teeth or splines on the circumferential periphery thereof, preferably of sixty degree or ninety degree groove or wedge. Accordingly, the teeth project nominally radially, relative to the axis of the shaft 29 extending through the entire motor housing via bearings 30, 31 in appropriate apertures in each end member thereof. The bearings are preferably of a type capable of accepting radial as well as axial loads.

A universal ball joint 35 is secured in any convenient manner to the motor shaft at the point of dynamic balance of the wobble drum, to provide a pivot point for a drum or substantially cylindrical element 37. The drum is provided with centrally positioned pivotal coupling member 38 having a surface which bears against the universal ball 35. In addition, the drum is undercut along end portions 39, 40 of its inner surface to permit insertion and fastening of toroidal regions of magnetic material 43, 44, respectively, to ensure response of the drum to the magnetic field as the stator windings are energized. At each of its ends drum 37 is provided with a circular gear 47, 48 having teeth projecting radially inwardly from the internal periphery, and cut to mate with the teeth of the cooperating gears. Thus, gear 48 at the end of the drum opposite fixed drive gear 27 has teeth cut to mesh with those of the fixed drive gear, although these two gears may have a tooth differential, i.e., a difference in number of teeth, or not depending on desired rotational speed. Adjacent the opposite end of the drum and pinned to the shaft in opposing relationship to circular gear 47 thereat is a further circular gear 50, hereinafter referred to as the rotary drive gear, having teeth projecting radially outwardly relative to the axis of the shaft and cut to mate with those of drum gear 47 with which it cooperates. Preferably, gears 47 and 50 are provided with teeth having the form of a 90° root and wedge.

In the preferred embodiment, drum gear 48 and fixed drive gear 27 have the same number of teeth, and consequently there will be no rotation of rotor drum 37 relative to the housing as the phases of the two stators A and B are energized in a predetermined sequence to be discussed presently. However, the rotary drive gear 50 preferably has one less tooth than drum gear 47 to produce rotation of the rotary drive gear, and hence, of the shaft, relative to the drum and housing in a direction opposite that of the wobble of the drum. For example, mating gears 27 and 48 may each have 60 teeth, while gear 47 has 360 and gear 50 has 359 teeth.

For the eight phase stators A and B as shown, i.e., eight field winding-core combinations for each stator, this configuration results in a rotation of the rotary drive gear by one tooth for each eight phases of stator energization. The shaft, therefore, undergoes very slow and precise rotary motion in response to the energizations of the phases of the stators.

In operation, the motor phases may be driven in desired sequence by a stepping driver of a type corresponding or similar to that disclosed, for example, in my co-pending application Serial No. 581,334, although other forms of stator drivers may alternatively be employed if desired. As the phases are switched, the rotor drum is successively attracted to the respective stator poles and for this reason it is desirable that the corresponding phases, e.g., 1 on ring 20 and 1 on ring 21 (FIGURES 2 and 3), be energized simultaneously to cock the drum in the manner shown in FIGURE 1. For each "wobble around" of the drum, the rotary drive gear 50 rotates one tooth, as previously explained, although there is no relative rotation between drum and housing, for the tooth differentials stated earlier.

Figure 4:
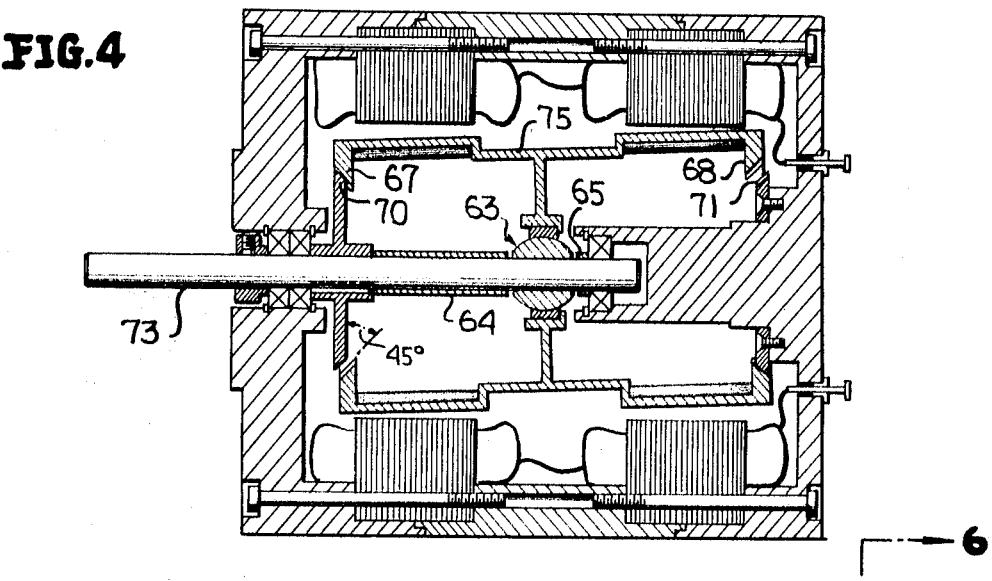
FIGURE 4 is a sectional view similar to that of FIGURE 1 showing another embodiment of a wobble drum step motor according to the present invention.

The wobble drum step motor embodiment of FIGURE 4 bears substantial resemblance to that of FIGURES 1–3, and hence will be described only in respect to differences therebetween. The principal distinguishing characteristics of the step motor of FIGURE 4 are the provision of a universal joint 63 (ball-and-socket arrangement, as shown) free to move axially of the shaft within predetermined limits set by sleeves 64, 65, but confined radially of the shaft; and the cutting of the teeth of the drum gears 67, 68 and driving gears 70, 71 at respectively cooperating angles.

Again, drive gear 71 is attached to the housing or frame so as to be relatively fixed. The shaft 73 does not extend through both ends of the motor in the embodiment shown, although this is not critical to operation of the motor. Rotary drive gear 70 is keyed to the shaft so that these two elements rotate together.

In this embodiment, as the motor phases are switched in accordance with energization of the windings, the rotor drum 75 undergoes a wobbling motion and may undergo rotation relative to the housing depending on tooth differential between gears 68 and 71. The gears 67, 70 also mesh as a result of the wobbling of the drum, and the rotary drive gear 70 and shaft 73 thus rotate with respect to the housing because of the tooth differential between the latter two gears.

By virtue of the axial freedom of the drum (on the pivot point provided by the axially free universal joint), and the angle of the teeth (say, 45° as indicated in the figure), the drum is capable of assuming a position in which both sets of teeth are in full mesh, held by the magnetic field. Such operation prevents rotational looseness which may otherwise produce inaccuracies in the step motor performance. The tooth angle also assures a division of seating pressure of the drum gears on the driving gears since the drum position is adjusted axially in response to the magnetic fields.

Preferably, in each of the wobble drum motor embodiments, the cylindrical armature or drum is dimensioned, relative to the dimensions of the cooperating and ancillary structure of the motor, to be capable of angular orientation or alignment at an angle of approximately one degree relative to the axis of the stators (and hence, of the shaft). This angle is, of course, exaggerated in the figures for the sake of clarity.

Figure 5:
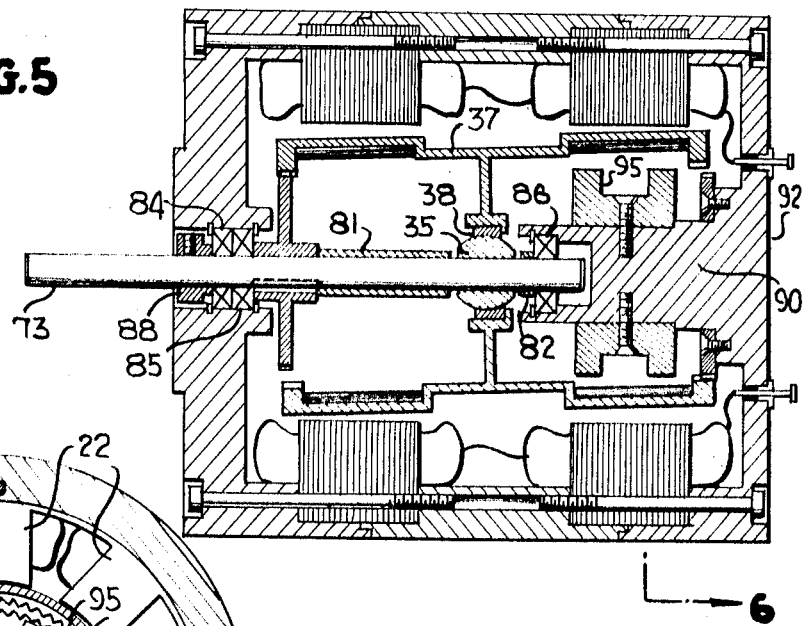
FIGURE 5 is a sectional view of the motor similar to the views shown in FIGURES 1 and 4, for an embodiment provided with magnetic detent.
Figure 6:
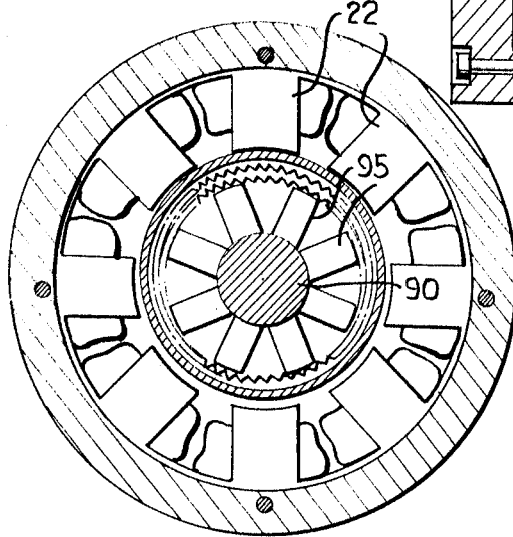
FIGURE 6 is a sectional view of the motor of FIGURE 5 taken along the lines 6—6 of FIGURE 5.

The motor embodiment of FIGURES 5 and 6 is similar to that shown in FIGURES 1–3 with structural improvements including some shown in the embodiment of FIGURE 4. It will be observed for example, from FIGURES 4–6, that ball bearing 35 is maintained substantially centrally of the cylindrical armature 37 via socket member 38, and is free to move axially along the shaft 73 within the limits imposed by a pair of sleeves 81, 82, which may be composed of either rigid or somewhat flexible material and are preferably self-lubricating to prevent any opposition to rotation of the shaft. As in the previous embodiments, the ball bearing 35 is dimensioned for confinement from movement in a radial direction from the shaft.

Shaft 73 is retained for rotation by thrust bearings 84, 85 at the point from which it projects outwardly of the housing, and bearing 86 within the housing. An adjustable load collar 88 encompasses the shaft at the point of egress.

Disposed in geometrically radiating fashion about a central extension member 90 of motor housing end wall 92 are a plurality of small permanent magnets 95 (best shown in FIGURE 6) which are preferably fixed along radii intersecting pairs of the inwardly projecting stator cores 22. These magnets are of sufficient strength to maintain the cylindrical armature in its last angularly oriented position following de-energization of the field windings, with negligible interference in the operation of the armature as the winding energization proceeds. Because only a very limited torque is applied to the drum by the magnets 95, the latter provide a magnet detent for holding the angular position of the shaft (relative to a fixed radial datum line), until the drum is dislodged by the magnetic field accompanying excitation of the field.

While I have described and illustrated one specific embodiment of my invention, it will be clear that variation of the details of construction which are specifically illustrated and described may be resorted to without departing from the spirit and scope of the invention as defined in the appended claims.

I claim:

1. A step motor comprising a housing, a dual stator in said housing, each stator having a plurality of poles arranged in circular array, said stators separated from each other along a common longitudinal axis, a coil for each stator pole, a shaft having said axis, a cylindrical armature pivotally secured to said shaft and responsive to energization of opposite pairs of said coils for angled longitudinal alignment relative to said axis in accordance with the energized coils, said armature having at opposite end portions thereof a pair of gears projecting radially toward said axis, and a pair of driving gears, one of said driving gears secured to said shaft for rotation therewith and in cooperating relationship with one of said armature gears, the other of said driving gears fixed relative to said housing to prevent relative rotation therebetween and in cooperating relationship with the other of said armature gears, whereby sequential energization of pairs of said coils on opposite stators produces wobble motion of said armature and rotation of said shaft according to tooth differential between said cooperating gears.

2. The combination according to claim 1 wherein said armature is pivotally secured to a universal joint on said shaft.

3. The combination according to claim 2 wherein said universal joint is free to move axially of said shaft and is constrained from moving radially of said shaft.

4. The combination according to claim 3 wherein said cooperating gears are cut at an angle to each other.

5. The combination according to claim 1 wherein is provided means for maintaining said armature in the last position of said angled longitudinal alignment upon de-energization of said coils.

6. The combination according to claim 5 wherein said armature position-maintaining means comprises a plurality of permanent magnets radially fixed in symmetrical array about said axis having magnetic field strengths less than those generated upon energization of said coils.

7. A stepping motor comprising a cylindrical armature having a longitudinal axis, a rotatable shaft normally oriented along said axis, means coupling said armature and said shaft for longitudinal pivotal relationship to one another, means for selectively pivoting said armature in wobble motion about said shaft and means cooperatively engaging said armature and said shaft for converting said wobble motion of said armature to rotatory motion of shaft.

8. The invention according to claim 7 wherein said means coupling said armature comprises a universal joint constrained from moving radially of said shaft.

9. The invention according to claim 8 wherein said means for selectively pivoting comprises a plurality of sequentially energizable electromagnetic means disposed about said shaft for forcing said armature, when selectively energized, to a cocked orientation relative to said shaft.

10. The invention according to claim 9 wherein said converting means comprises a ring gear connected to said armature and a cooperating ring gear connected to said shaft, said gears having a tooth differential.

References Cited

UNITED STATES PATENTS

| | | | |
|---|---|---|---|
| 2,509,391 | 5/1950 | Hansen et al. | 310—82 X |
| 3,294,994 | 12/1966 | Anderson | 310—82 |
| 3,341,725 | 9/1967 | Gifford | 310—80 |
| 3,392,293 | 7/1968 | De Boo et al. | 310—49 |

WARREN E. RAY, Primary Examiner

U.S. Cl. X.R.

310—82, 83